United States Patent
Adragna

(10) Patent No.: US 8,467,209 B2
(45) Date of Patent: Jun. 18, 2013

(54) CONTROL DEVICE OF A SWITCHING POWER SUPPLY

(75) Inventor: Claudio Adragna, Monza (IT)

(73) Assignee: STMicroelectronics S.r.l., Argrate Brianza (IT)

( * ) Notice: Subject to any disclaimer, the term of this patent is extended or adjusted under 35 U.S.C. 154(b) by 148 days.

(21) Appl. No.: 13/191,300

(22) Filed: Jul. 26, 2011

(65) Prior Publication Data

US 2012/0026766 A1  Feb. 2, 2012

(51) Int. Cl.
*H02M 7/217* (2006.01)
*G05F 1/70* (2006.01)

(52) U.S. Cl.
USPC .............................. 363/89; 323/222

(58) Field of Classification Search
USPC ............ 323/207, 222, 275, 284, 285; 363/78, 363/84, 89
See application file for complete search history.

(56) References Cited

U.S. PATENT DOCUMENTS

| | | | |
|---|---|---|---|
| 5,367,247 A | 11/1994 | Blocher et al. | |
| 5,742,151 A * | 4/1998 | Hwang | 323/222 |
| 6,259,614 B1 | 7/2001 | Ribarich et al. | |
| 6,307,361 B1 | 10/2001 | Yaakov et al. | |
| 7,042,743 B2 * | 5/2006 | Pidutti et al. | 363/89 |
| 7,239,120 B2 * | 7/2007 | Adragna et al. | 323/285 |
| 7,279,876 B2 * | 10/2007 | Adragna et al. | 323/284 |
| RE40,016 E | 1/2008 | Ribarich et al. | |
| 7,821,237 B2 * | 10/2010 | Melanson | 323/222 |
| 7,863,828 B2 * | 1/2011 | Melanson | 315/247 |
| 7,884,588 B2 * | 2/2011 | Adragna et al. | 323/272 |
| 8,040,703 B2 * | 10/2011 | Melanson | 363/89 |
| 8,270,190 B2 * | 9/2012 | Adragna | 363/89 |
| 2004/0095101 A1 | 5/2004 | Pidutti et al. | |
| 2004/0263140 A1 | 12/2004 | Adragna et al. | |
| 2006/0013026 A1 | 1/2006 | Frank et al. | |
| 2006/0022648 A1 * | 2/2006 | Ben-Yaakov et al. | 323/222 |
| 2006/0208789 A1 | 9/2006 | Shimada | |

(Continued)

FOREIGN PATENT DOCUMENTS

EP  1387476 A1  2/2004

OTHER PUBLICATIONS

Adragna, C., "Control Loop Modeling of L6561-Based TM PFC," Application Note AN1089, STMicroelectronics, Mar. 2000, 12 pages.

(Continued)

*Primary Examiner* — Adolf Berhane
(74) *Attorney, Agent, or Firm* — Seed IP Law Group PLLC

(57) ABSTRACT

A control device controls a switching converter that converts an alternating supply voltage to a regulated voltage and comprises a switch connected to an inductor. The control device is adapted to control the on period and the off period of said switch for each cycle. The control device comprises a ramp generator adapted to generate a ramp voltage, a comparator adapted to determine the final instant of the on period of the switch by crossing the ramp voltage with a first voltage. The control device has a first signal representing a current through the inductor and a second signal representative of the current flowing through at least one element of the converter. The control device is adapted to control the closing of said switch according to said first signal and comprises a synchronizer adapted to synchronize the start of the ramp voltage with the zero crossing of said second signal.

11 Claims, 6 Drawing Sheets

U.S. PATENT DOCUMENTS

2008/0246444 A1   10/2008  Shao et al.
2009/0141524 A1*  6/2009  Fagnani et al. ................. 363/89
2010/0110593 A1   5/2010  Kim et al.
2011/0175587 A1*  7/2011  Hosotani ....................... 323/283
2012/0026765 A1*  2/2012  Adragna ......................... 363/78
2012/0262082 A1*  10/2012 Esaki et al. ................... 315/224

OTHER PUBLICATIONS

Langeslag, W. et al., "VLSI Design and Application of a High-Voltage-Compatible SoC-ASIC in Bipolar CMOS/DMOS Technology for AC-DC Rectifiers," IEEE Transactions on Industrial Electronics 54(5):2626-2641, Oct. 2007.

Kim, J.W. et al., "Variable On-time Control of the Critical Conduction Mode Boost Power Factor Correction Converter to Improve Zero-crossing Distortion," International Conference on Power Electronics and Drives Systems, 2005 (PEDS 2005):1542-1546, Nov. 2005.

Huber, L. et al., "Effect of Valley Switching and Switching-Frequency Limitation on Line-Current Distortions of DCM/CCM Boundary Boost PFC Converters," IEEE Transactions on Power Electronics 24(2):339-347, Feb. 2009.

* cited by examiner

CONTROL DEVICE OF A SWITCHING POWER SUPPLY

BACKGROUND

1. Technical Field

The present disclosure relates to a control device of a switching power supply.

2. Description of the Related Art

It is generally known to use devices for actively correcting the power factor (PFC) of switching power supplies used in electronic apparatuses of common use such as computers, televisions, monitors, etc. and for supplying power to fluorescent lamps, i.e., switching pre-regulator stages which must absorb a current from the power line, said current is quasi-sinusoidal and phased with the supply voltage. A switching power supply of the current type thus comprises a PFC and a DC-DC converter connected to the PFC output.

A typical switching power supply comprises a DC-DC converter and an input stage connected to the power distribution line which comprises a full-wave diode rectifier bridge and a capacitor connected downstream so as to produce a non-regulated direct voltage from the sinusoidal alternating supply voltage. The capacitor has a great enough capacitance for a relatively small ripple being present at its terminals as compared to a direct level. Therefore the rectifier diodes of the bridge will only conduct over a short portion of each half cycle of the supply voltage, as the instantaneous value thereof is less than the voltage of the capacitor over most of the cycle. The result is the current absorbed by the power line consists of a series of short impulses the amplitude of which is 5-10 times the resulting average value.

This has significant consequences: the current absorbed from the power line has peak and rms (root-mean-square) values much higher than the case of sinusoidal current absorption, the supply voltage is distorted due to the almost simultaneous impulse absorption of all utilities connected to the power line, the current in the neutral conductor in the case of three-phase systems is highly increased and there is low use of the energy potentials of the power system. In fact, the waveform of impulse current includes many odd harmonics, which although they do not contribute to the power provided to the load, they contribute to increasing the rms current absorbed by the power line and therefore to increasing the energy dissipation.

In quantitative terms, this may all be expressed both in terms of Power Factor (PF), intended as ratio of the real power (the one the power supply sends to the load plus the one dissipated therein in the form of heat) to the apparent power (the product of the rms voltage by the rms current absorbed), and in terms of Total Harmonic Distortion (THD), generally intended as percentage ratio of the energy associated with all larger harmonics to the one associated with the fundamental harmonic. Typically, a power supply with capacitance filter has a PF between 0.4 and 0.6 and a THD higher than 100%.

A PFC arranged between the rectifier bridge and the input of the DC-DC converter allows a current quasi sinusoidal and phased with the voltage, to be absorbed from the network, thus making the PF close to 1 and decreasing the THD.

FIG. 1 schematically shows a PFC pre-regulator stage comprising a boost converter 20 and a control device 1. The PWM control device has a variable frequency, also called "Transition Mode" (TM) as the device works on the borderline between the continuous (CCM) and discontinuous (DCM) modes of conducting current through the inductor; in particular, device 1 is of the constant Ton type. According to this method, the turn-on period of the power transistor is used as a control variable and, during each cycle of the supply voltage, it is kept constant at the value required to obtain the regulation of the voltage output from the converter 20 by means of a feedback control loop. The boost converter 20 comprises a full-wave diode rectifier bridge 2 having an input supply voltage Vac, a capacitor C1 (which serves as a high frequency filter) having a terminal connected to the diode bridge 2 and the other terminal connected to ground GND and on which a voltage Vin exists, an inductance L connected to a terminal of the capacitor C1, a MOS power transistor M having the drain terminal connected to a terminal of the inductance L downstream of the latter and having the source terminal connected to ground GND, a diode D having the anode connected to the common terminal of the inductance L and the transistor M, and the cathode connected to a capacitor Co having the other terminal connected to ground GND. The boost converter 20 generates an output direct voltage Vout across the capacitor Co which is higher than the maximum peak supply voltage, typically 400 V for systems powered by means of European power line or universal power line. Such a voltage Vout will be the input voltage of the DC-DC converter connected to the PFC.

The control device 1 should keep the output direct voltage Vout at a constant value by means of a feedback control action. The control device 1 comprises an operational error amplifier 3 adapted to compare part of the output voltage Vout, i.e., the voltage Vr given by Vr=R2×Vout/(R2+R1) (where the resistances R1 and R2 are connected in series to each other and the series is in parallel to the capacitor Co) with a reference voltage Vref, e.g., of the value of 2.5 V, and generates an output error signal Se across a capacitor Ce connected between the output of amplifier 3 and ground GND.

The error signal Se is sent to the inverting input of a comparator PWM 5 while the signal Srs exists at the non-inverting input; the signal Srs is a voltage ramp across a capacitor Cc powered by a current generator Ic in the time periods whenever the switch T1 is open, which coincide with those when M is on as precisely the duration Ton of the turn-on of M is to be controlled. If signals Srs and Se are equal, the comparator 5 sends a signal to a control block 6 adapted to control the transistor M and which, in this case, turns it off. Block 6 comprises a zero current detecting block 7 having at the input the signal Saux deriving from the inductor Laux coupled with the inductor L; the signal Saux is representative of the demagnetization of the core of the transformer formed by the inductances L and Laux. Block 7 is capable of sending an impulse signal to a OR gate 8, the other input of which is connected to a starter 10, adapted to send a signal to the OR gate 8 at the initial instant of time; the output signal S of the OR gate 8 is the set input S of a set-reset flip-flop 11 having another input R which is the signal at the output from the comparator 5, and having an output signal Q and an output signal Q* which is the negated signal Q. The signal Q is sent to the input of a driver 12 which controls the turn-on or turn-off of the transistor M and therefore the duration of the turn-on time period Ton and the turn-off time period Toff in each switching cycle Tsw while the signal Q* controls the closing and opening of switch T1.

BRIEF SUMMARY

One embodiment of the present disclosure provides a control device of a switching power supply.

One embodiment of the present disclosure is a control device of a switching converter, said converter having an input alternating supply voltage and a regulated direct voltage on the output terminal, said converter comprising a switch connected to an inductor and said control device being adapted to control the on and off time period of said switch for each cycle, said control device comprising first means adapted to generate a ramp voltage, second means adapted to determine the final instant of the on period of the switch by crossing said ramp voltage with a first voltage, said control device having a first input signal representative of the demagnetization of the core of the transformer comprising the inductor and a further inductive element magnetically coupled with said inductor, said control device being adapted to control the closing of said switch according to said first signal, characterized in that said control device has a second input signal representative of the current flowing through at least one element of the converter and comprises further means adapted to synchronize the start of the ramp voltage with the zero crossing of said second signal, with said switch being closed.

BRIEF DESCRIPTION OF THE SEVERAL VIEWS OF THE DRAWINGS

The features and advantages of the present disclosure will become apparent from the following detailed description of practical embodiments thereof, shown by way of non-limiting examples in the accompanying drawings, in which.

DETAILED DESCRIPTION

Figure 1:
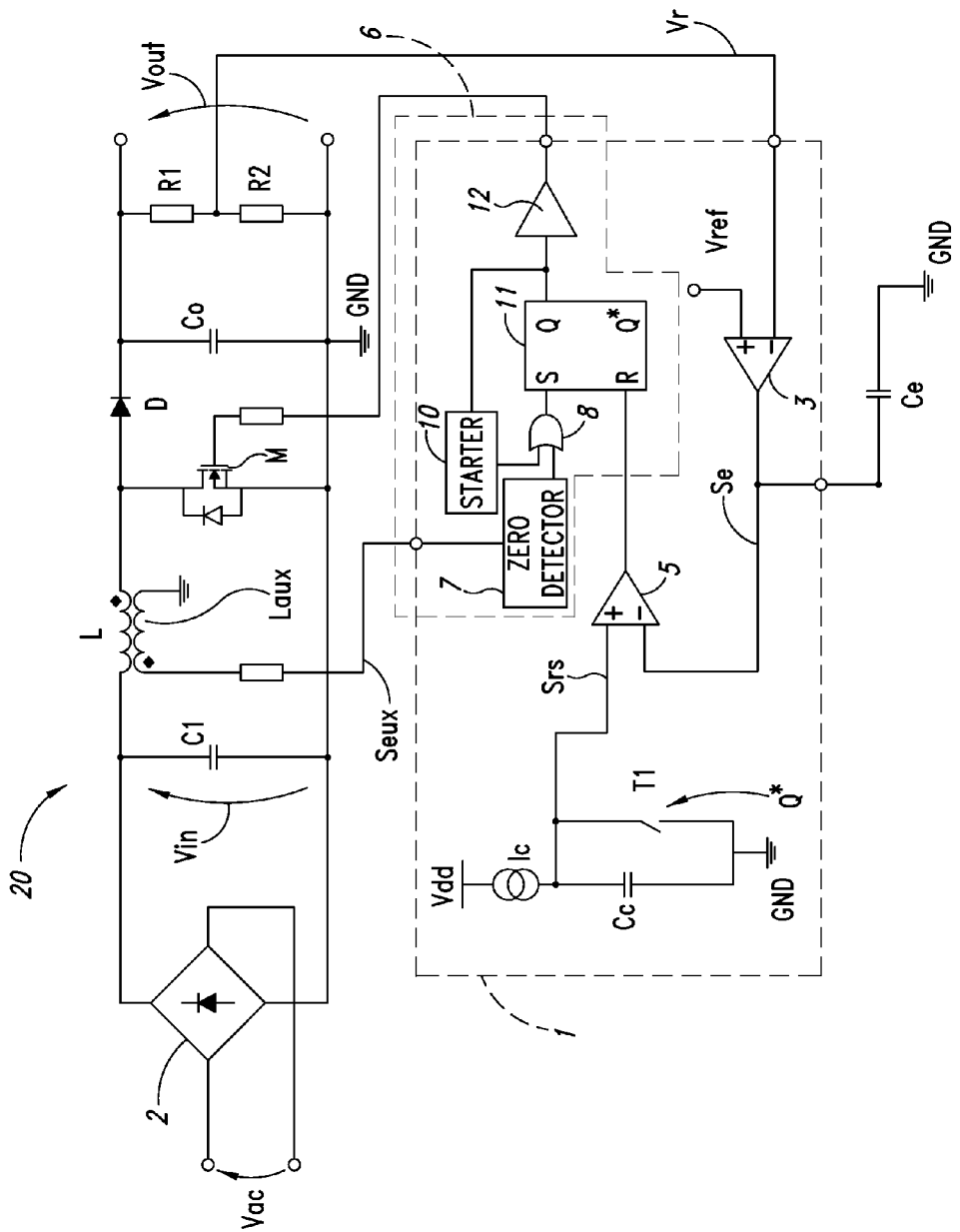
FIG. 1 shows a control device of a switching power supply in accordance with the known art.
Figure 2:
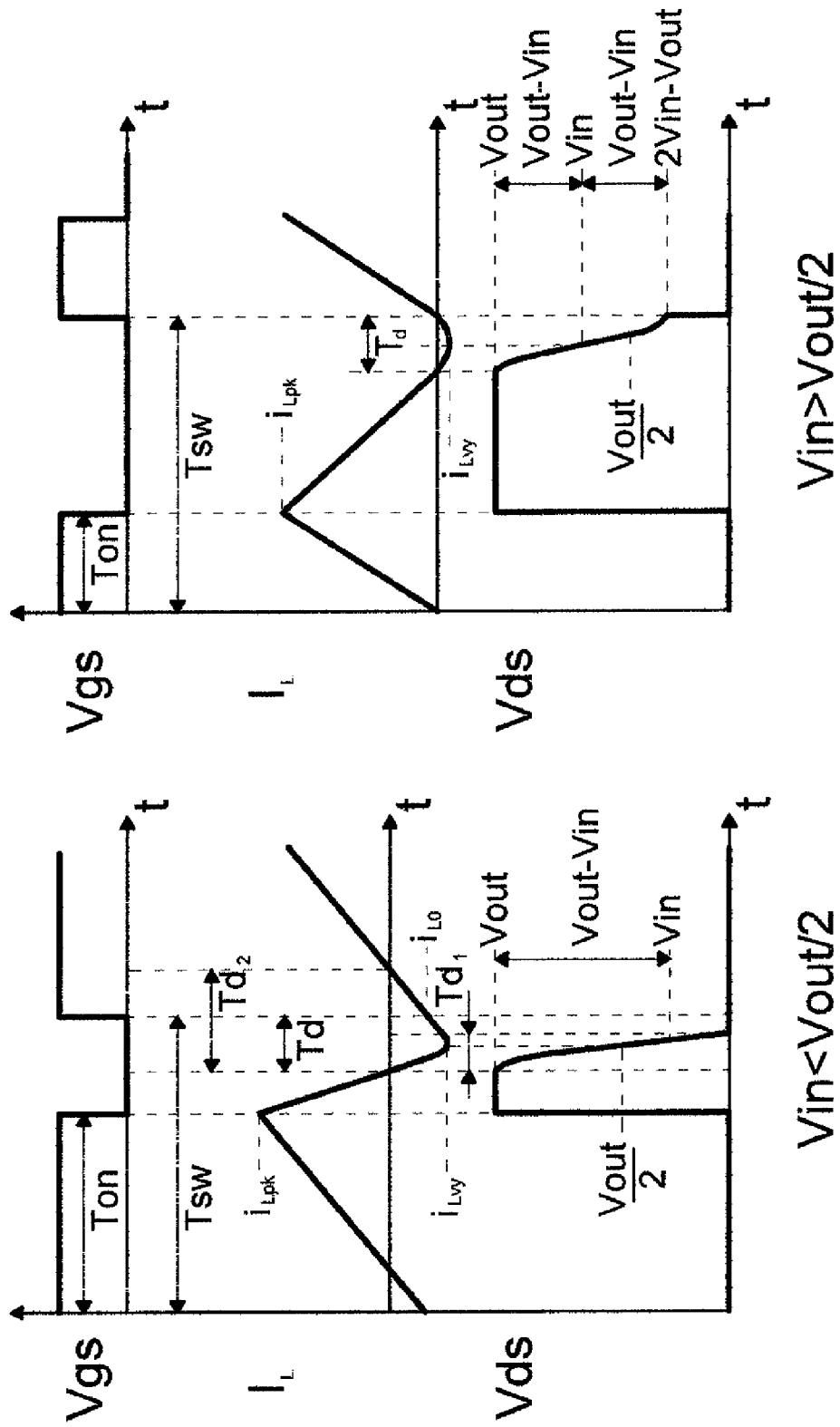
FIG. 2 shows the time diagrams of some signals involved in the circuit in FIG. 1 if Vin<Vout/2 or Vin>Vout/2.

FIG. 2 shows the time diagrams of some signals involved in the circuit in FIG. 1, i.e., the voltage between the gate and source terminals of transistor M Vgs, the voltage between the drain and source terminals of transistor M Vds and the current in inductor $I_L$.

In TM operation, operation is never exactly done at the borderline between DCM and CCM but slightly in DCM. In fact, the transistor M is not turned or conveniently when the current of the inductor is zeroed, as the voltage Vds in that moment is still equal to the output voltage Vout (typically 400 V); therefore, the parasitic capacitance Cd associated with the drain terminal in that moment has energy equal to $\frac{1}{2} \cdot Cd \cdot Vout^2$ which would be dissipated in the resistance $R_{DS(on)}$ of transistor M when it is turned on. If instead the turn-on is delayed until the oscillation of voltage Vds resulting from zeroing the current $I_L$ of the inductor reaches its minimum, equal to 2Vin−Vout, the power stored in the parasitic capacitance Cd and dissipated in the transistor M at the turning-on would be considerably reduced.

Moreover, if 2Vin−Vout<0 (i.e., Vin<Vout/2), where the body diode of transistor M substantially cuts the oscillation to zero, these energy losses would be zeroed resulting in the so-called "soft-switching". In part due to their operation and in part due to the introduction of intentional delays, zero current detection circuits or ZCD inside the controllers PFC, such as that shown in FIG. 1, allow the transistor M to be turned on at the drain oscillation valley ("valley switching"); this delay is indicated by Td, which is equal to half the period of said oscillation. This slightly moves the operation in DCM, but the remarks made on the pure TM are still valid, at least until Td is negligible with respect to the switching period, which typically occurs in a fairly large field of operating conditions of the converter if values Vin>>0 are considered, which are the significant ones in terms of the power transfer.

During the oscillation of voltage Vds, the current $I_L$ of inductor L becomes negative, by passing through the parasitic capacitance of transistor M and, also possibly the body of transistor M if the voltage Vds reaches zero and, thus, directly biases it.

In this latter case, shown in the left-hand time diagrams, the voltage Vds reaches zero after a time $Td_1$<Td; until that moment, the current $I_L$ of the inductor is sinusoidal, but from this moment on, due to the turning on of the body diode, which sets a voltage substantially equal to Vin at its terminals, it starts linearly increasing and at the instant Td is still negative. At this point, the transistor M (the voltage Vgs is forced high) is turned on and the direct current ramp starts. The current becomes positive at the instant $Td_2$>Td. Therefore, there is a time interval in which transistor M is turned on, but the current $I_L$ of the inductor is negative. It should be noted that, if the input voltage is such that the peak voltage Vpk is Vpk<Vout/2 (which occurs with the American or Japanese power line, for example), this time interval exists in the entire power line cycle. The ratio of the duration of this interval to that of the switching cycle becomes increasingly greater as the voltage Vin decreases, thus reaching the maximum at the zeroes of the supply voltage (Vin=0). In addition to this, as the current peak tends to zero when Vin tends to zero, the negative peak of the inductor current may even become higher than the positive peak around the zeros of the supply voltage.

If 2Vin−Vout>0 (i.e., Vin>Vout/2), the oscillation valley of the voltage Vds remains at a positive value and the body diode is not turned on. Therefore, the negative portion of the current of the inductor is entirely a sinusoidal arch and the current is zero at the instant Td when transistor M is turned on (i.e., $Td_2$=Td). Therefore, the time interval when the current is negative with the transistor M turned on is absent, but the negative peak of the inductor current (in this case of lower amplitude because the oscillation of voltage Vds is of lower amplitude) may be comparable to the positive peak around the zeroes of the supply voltage.

The current $I_L$ of the inductor linearly rises with a slope of $$\frac{dI_L}{dt} = \frac{Vin}{L}$$

in each turn-on cycle of transistor.

Since the input voltage is sinusoidal, Vin=Vpk sin θ where θ is the phase angle of the supply voltage, therefore:

$$\frac{dI_L}{dt}(\theta) = \frac{Vpk}{L}\sin\theta.$$

Considering the initial value $I_{L0}$ of the inductor current when transistor M is turned on, the peak value of the current of the inductor will be:

$$I_{Lpk}(\theta) = I_{L0} + \frac{Vpk}{L} Ton \cdot \sin\theta,$$

$I_{L0}=0$ if Vin>Vout/2 while, by neglecting the variation of current in the interval between Td/2 and $Td_1$, if Vin<Vout/2, $I_{L0}$ may be assumed to be equal to the negative peak $I_{Lvy}$ (which occurs at the instant Td/2), which is equal to:

$$I_{L0} \approx I_{Lvy} = \frac{Vin - Vout}{Zd} = \frac{Vpk\sin\theta - Vout}{Zd},$$

where Zd is the characteristic impedance of the resonant circuit consisting of the inductor and the parasitic capacitance on the drain terminal. Therefore, considering the preceding equations:

$$I_{Lpk}(\theta) = \begin{cases} -\frac{Vout}{Zd} + Vpk\sin\theta\left(\frac{1}{Zd} + \frac{1}{L}Ton\right) & Vpk\sin\theta < Vout/2 \\ \frac{Vpk}{L} Ton \cdot \sin\theta & Vpk\sin\theta \geq Vout/2 \end{cases}$$

Therefore with a constant period Ton, there is only a sinusoidal envelope of the peak current for instantaneous values of the supply voltage which are higher than Vout/2. There is a reduction of the peak value $I_{Lpk}(\theta)$ for values less than Vout/2 and, accordingly, a distortion of the envelope due to the constant term $-Vout/Zd$, which reduction is as great as said instantaneous voltage is low. It is obvious that said distortion results in the distortion of the mains current and therefore in a greater THD and a lower PF.

Furthermore, the reduction of the peak current has a further deleterious action on the THD: the increase of crossover distortion, seen as a brief flat zone in the waveform of the input current close to the zeroes of the supply voltage.

This distortion growing as the load of the PFC decreases and as the rms supply voltage increases, derives from the input-output energy transfer defect which occurs close to the zeros of the supply voltage. In that zone, the energy stored in the inductor—linked to the peak value of the current—is very low, insufficient to charge the parasitic capacitance Cd until reaching the voltage Vout (typically 400 V) so as to turn on the diode D and transfer the power of the inductor to the output. Therefore, the diode is not turned on over a certain number of switching cycles and the energy is partially returned to the filter capacitor arranged downstream the rectifier bridge. This is not discharged and keeps the bridge in inverse bias, by deleting the input current and performing a dead zone in the waveform of the line current.

The fact that the peak current for a given Ton is lower than the one expected in the region wherein Vin<Vout/2, results that the power transported around the zeroes of the supply voltage is further reduced with respect to the case of sinusoidal envelope. Thereby, the number of switching cycles is increased, in which there is no power transfer towards the output and, therefore, the dead zone of the current absorbed by the network widens, with the consequential increase of THD and further reduction of PF.

A further disadvantage is that as the input voltage Vin varies, the excursion Ton is greater for a fixed power level. Therefore, the variation of the output voltage of the error amplifier will also be greater than expectations from a system which does not have the aforesaid distortion (e.g., in the case of "peak current mode" control). This should be considered in the PFC stage design, otherwise the risk exists to affect the limits of the dynamics allowed at the output of the error amplifier and, therefore, to lose the regulation of the output voltage.

A last negative consequence of this variation of the output level of the error amplifier occurs by closing the voltage loop. In fact, a ripple double the network frequency which always overlaps the continuous level of said voltage, and which is due to the ripple of the output voltage and to the not null gain of the error amplifier at that frequency, determines a modulation of Ton. It is known from theory that this modulation is translated into a 3rd harmonic distortion of the peak current envelope, the quantity of which is inversely proportional to the continuous level of the error amplifier output. Hence, a greater excursion of said level produces a greater variation of THD to the variation of the input voltage.

Figure 3:
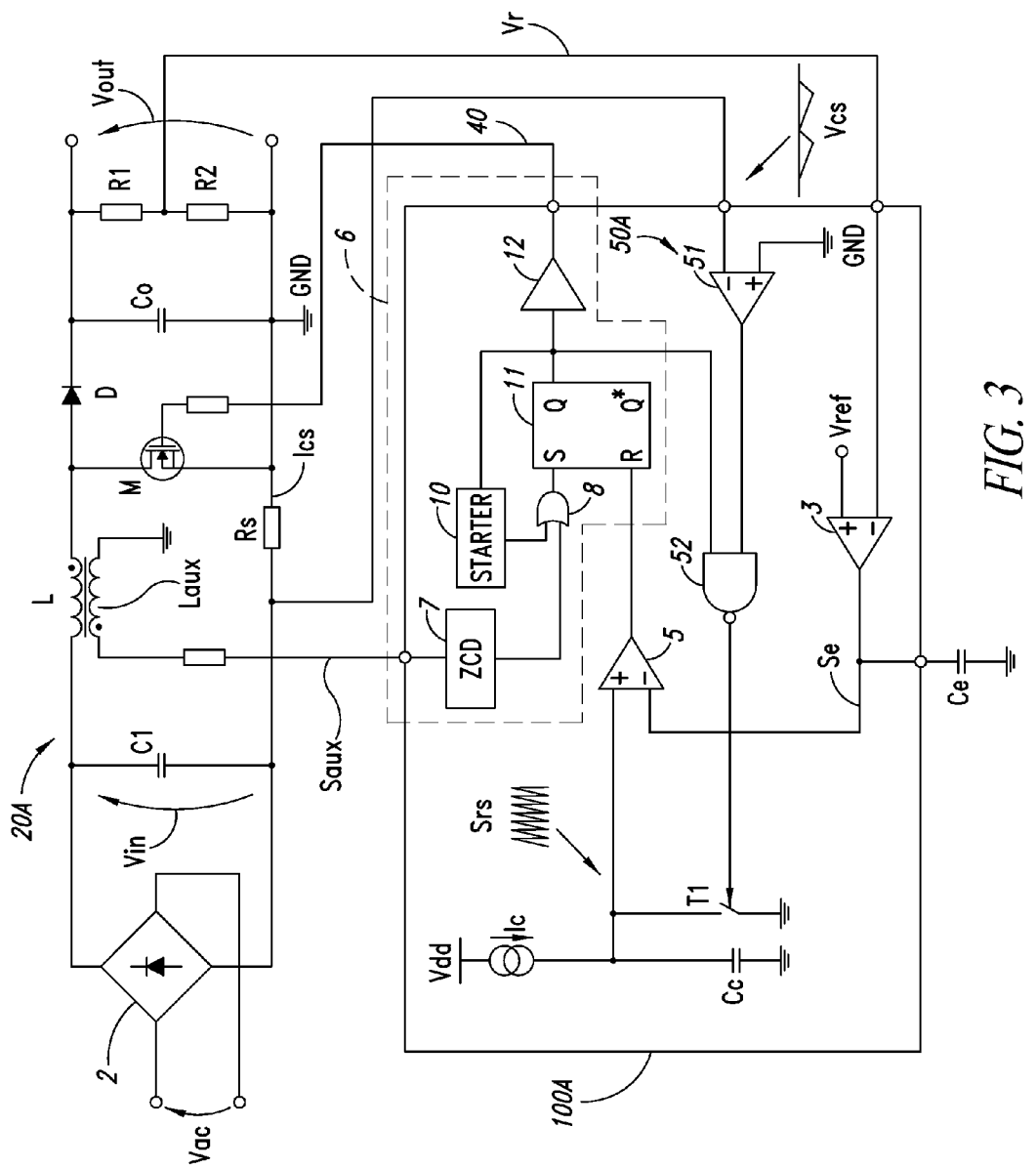
FIG. 3 shows a control device of a switching power supply in accordance with a first embodiment of the disclosure.

With reference to FIG. 3, a control device 100A of a switching power supply in accordance with a first embodiment of the present disclosure is shown. The power supply comprises a converter 20A, preferably a boost converter, having an input alternating supply voltage Vac and a regulated voltage Vout at the output terminal Out. The converter 20A comprises a switch M, preferably a MOS power transistor and the control device 100A is adapted to control the on time period Ton and the off time period Toff of said switch M at each cycle Tsw. The device 100A comprises a ramp generator, including elements Ic, Cc, Tl, adapted to generate a ramp voltage Srs and turn-off circuitry having elements 5, 11, 12 adapted to determine the final instant of the on period Ton of switch M by comparing said ramp voltage Srs with a first voltage Se. A current detector, preferably a resistance Rs of the converter 20A, is adapted to detect the value of the current Ics flowing through at least one element L, M, of the converter. The control device 100A comprises a synchronizer 50A adapted to synchronize the start Tslope of the ramp voltage Srs with the zero crossing of the signal Vcs representative of the current flowing through the converter, with the switch M being closed. In particular, the synchronization occurs exactly or with a short delay Tleb.

The boost converter 20A comprises a full-wave diode rectifier bridge 2 having an input supply voltage Vac, a capacitor C1 (which serves as a high frequency filter) having first and second terminals, respectively connected to the diode bridge 2 and to ground GND by the resistance Rs, across which a voltage Vin exists, an inductance L connected to the first terminal of the capacitor C1, a MOS power transistor M having the drain terminal connected to a terminal of the inductance L downstream of the latter and having the source terminal connected to ground GND, a diode D having the anode connected to the common terminal of the inductance L and the transistor M, and the cathode connected to a first terminal of a capacitor Co having a second terminal connected to ground GND. The boost converter 20A generates an output direct voltage Vout across capacitor Co which is higher than the maximum peak supply voltage, typically 400 V for systems powered by a European power line or universal power line. Such a voltage Vout will be the input voltage of the DC-DC converter connected to the PFC.

The control device 100A should keep the output voltage Vout at a constant value by means of a feedback control action. The control device 100A comprises an operating error amplifier 3 adapted to compare a portion of the output voltage Vout, i.e., the voltage Vr given by Vr=R2×Vout/(R2+R1)

(where the resistances R1 and R2 are connected in series to each other and the series is in parallel to the capacitor Co) with a reference voltage Vref, e.g., of the value of 2.5 V, and generates an output error signal Se across a capacitor Ce connected between the output of the amplifier 3 and ground GND.

The error signal Se is sent to the inverting input of a PWM comparator 5 while the signal Srs exists at the non-inverting input; the signal Srs is a voltage ramp across a capacitor Cc powered by a current generator Ic in the time periods wherein the switch T1 is open, which coincide with those when transistor M is on as precisely the duration of the time period Ton of the transistor M is to be controlled. If the signals Srs and Se are equal, the comparator 5 sends a signal to a control block 6 adapted to control the transistor M and which, in this case, turns it off. Block 6 comprises a zero current detecting block 7 having the input signal Saux from the inductor Laux coupled with the inductor L; the signal Saux is representative of the demagnetization of the core of the transformer formed by the inductances L and Laux. Block 7 is capable of sending an impulse signal to a OR gate 8, the other input of which is connected to a starter 10 adapted to send a signal to the OR gate 8 at the initial instant of time; the output signal S of OR gate 8 is the set input S of a set-reset flip-flop 11 having another input R which is the signal at the output from the comparator 5, and having an output signal Q. The signal Q is sent to the input of a driver 12 which controls the turn-on or turn-off of the transistor M by means of the signal GD.

The synchronizer 50A is adapted to synchronize the triggering of the voltage ramp Srs used to generate the time period Ton at the zero crossing by the inductor current Ics which occurs immediately after or simultaneously with the turn-on of the MOS transistor M. Thereby, the duration of the time period Ton will coincide with the duration of the positive ramp Srs, both for Vin<Vout/2 values and for Vin>Vout/2 values, and the envelope $I_{Lpk}(\theta)$ of the peaks of the inductor current Ics will be a sinusoidal arch for all values of Vin, from zero to Vpk.

In accordance with a first embodiment of the disclosure, a resistance Rs is introduced on the path toward ground GND of the current; the current Ics of the inductor L flows through this resistance, whereby such a current is shown in scale Rs by the drop of the voltage Vcs (negative with respect to ground) on said resistance. A current sensing system of the inductor is typically used for safety purposes to prevent the peak currents from reaching values dangerous for the power elements of the boost in the case of operation disturbances. Hence, the addition of this element is not an additional cost for the control device 100A.

Again in accordance with the first embodiment of the disclosure, the synchronizer 50A comprise a comparator 51 having its non-inverting input connected to ground GND and the inverting input connected to the resistance Rs and is adapted to compare the voltage Vcs across the resistance R—inverted image of the inductor current $I_L$—with the ground GND. The synchronizer 50 also comprise a NAND gate 52 powered by the signal Q and by the output of comparator 51. The signal at the output from the NAND gate 52 controls the closing and opening of the switch T1.

The output of the NAND gate 52 will go low, by opening the switch T1 and allowing the ramp Srs to start, when the signal Q and the output of the comparator 51 are both high, i.e., when the transistor M has been turned on and the voltage Vcs across the resistance Rs is negative, i.e., when the current flowing through the inductor becomes positive. Thereby, the ramp Srs, which is synchronized with the zeros crossing of the inductor current $I_L$, will always be associated with the positive path thereof only and the presence of an initial negative path becomes irrelevant.

The NAND gate may be also replaced with a OR gate, by bringing the signal Q*, i.e., the negated signal Q, instead of Q to one of its inputs, and by inverting the inputs of comparator 51.

Figure 4:
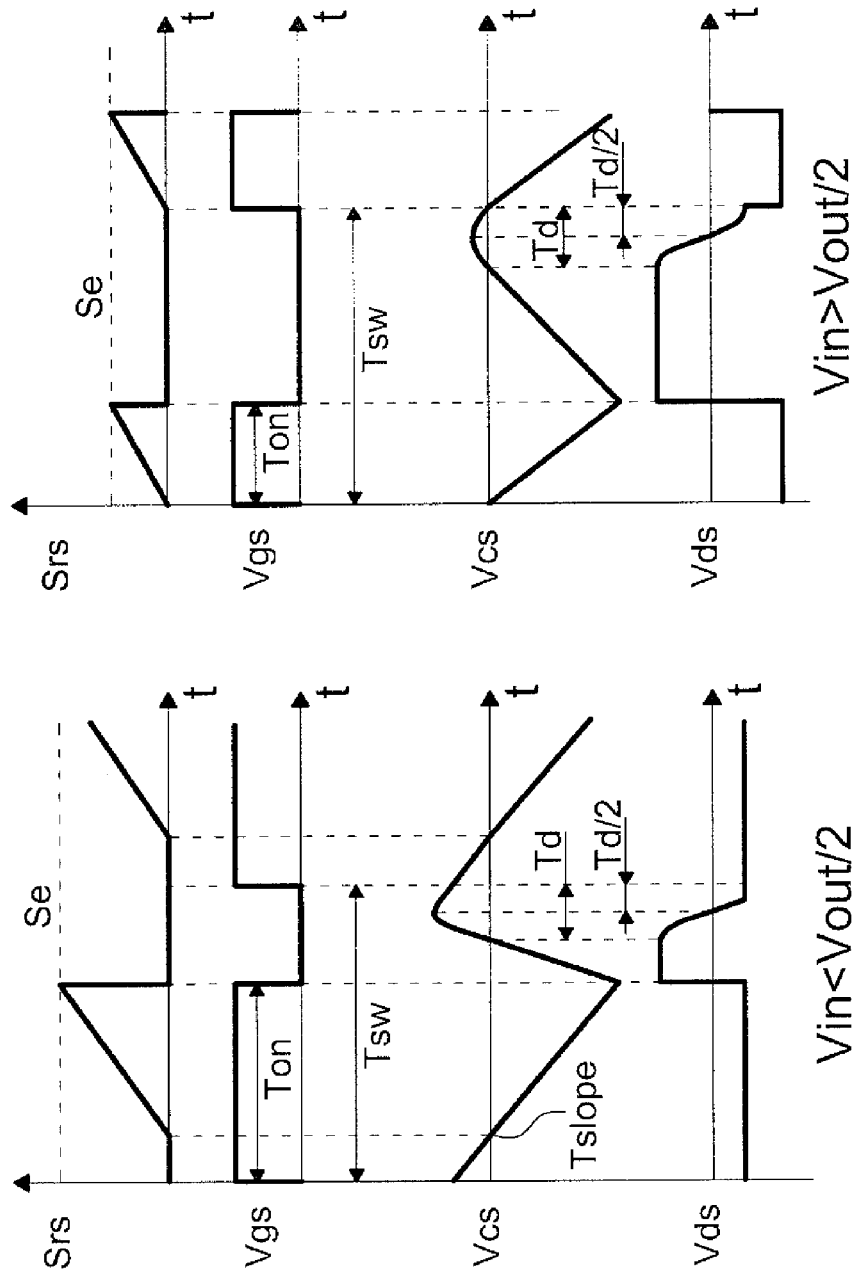
FIG. 4 shows the time diagrams of some signals involved in the circuit in FIG. 3 if Vin<Vout/2 or Vin>Vout/2.

FIG. 4 shows the time diagrams of some signals involved in the circuit in FIG. 3, i.e., the voltage Vgs between the gate and source terminals of transistor M, the voltage Vds between the drain and source terminals of transistor M, the ramp voltage Srs and the voltage Vcs across the resistance Rs.

Figure 5:
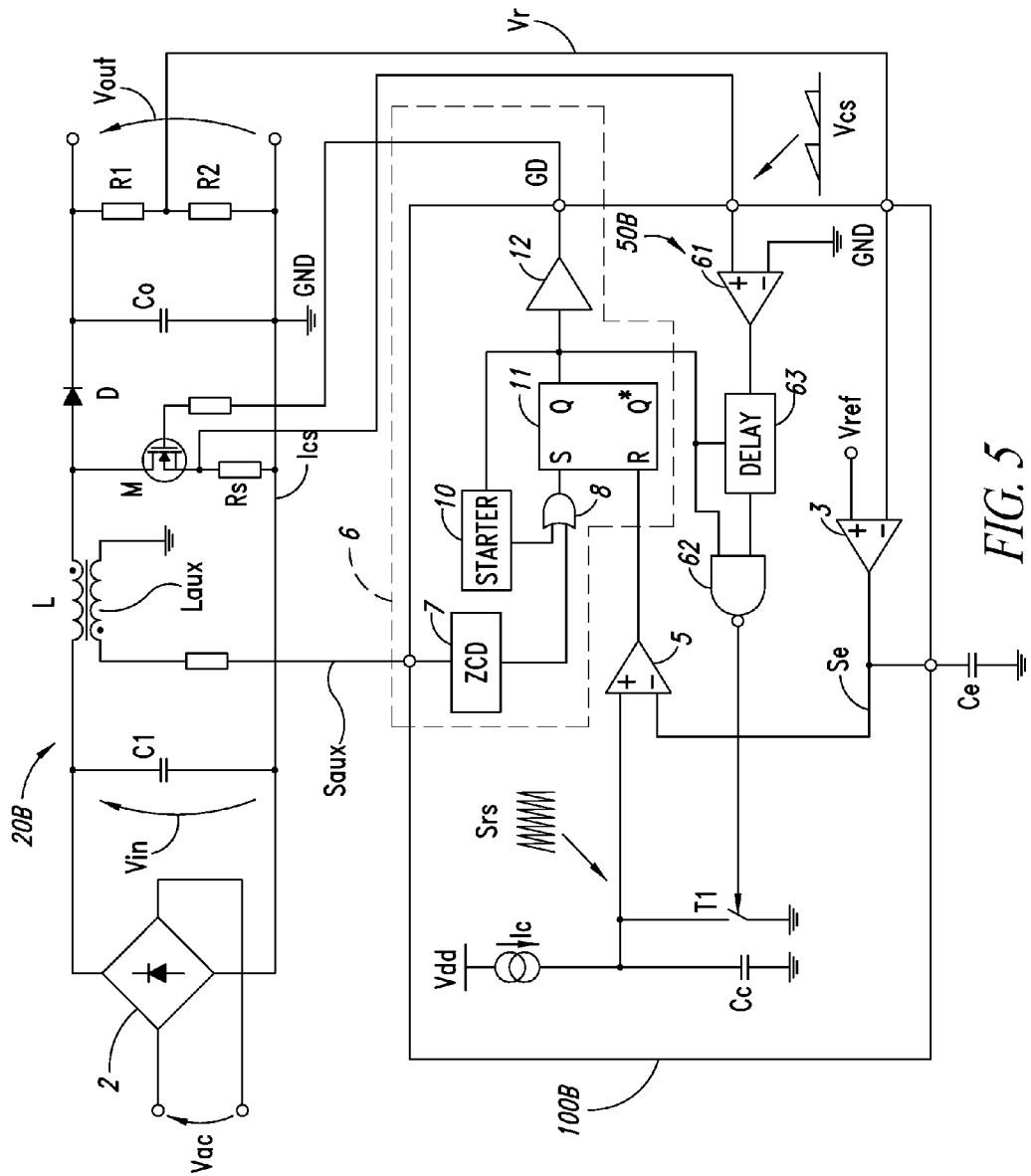
FIG. 5 shows a control device of a switching power supply in accordance with a second embodiment of the disclosure.

A second embodiment of the disclosure is shown in FIG. 5 and includes a switching converter 20B and a control device 100B. In the switching converter 20B, the resistance Rs is arranged in series to the source terminal of the transistor M, thereby only detecting the part of inductor current $I_L$ during the conduction step of the transistor M.

The control device 100B comprises a synchronizer 50B which comprise a comparator 61 having its non-inverting input connected to the resistance Rs and the inverting input connected to ground GND and adapted to compare the voltage across the resistance Rs, which is representative of the current circulating through the switch M, with the ground GND. The synchronizer 50B also comprise a NAND gate 62 powered by the signal Q and by the output of the comparator 61 which is delayed by means of a masking time period Tleb by the delay device 63. The output signal from the NAND gate 62 controls the closing and opening of switch T1.

The device 63 also receives the input signal Q and, for a pre-fixed time Tleb from the instant when the signal Q becomes high, provides a low output level independently from the status of the output of comparator 61; once the time Tleb has elapsed, the device 63 transfers the status of comparator 61 to the output.

The presence of device 63 is used in this current sensing configuration because when transistor M is turned on, a disturbance flows through the resistance Rs which overlaps the useful signal representing the inductor current. Such a disturbance, which occurs as a positive spike called "leading-edge spike", derives from two fundamental contributions: the first is the charging current of the gate capacitance, the second is the discharge current of the parasitic capacitance of the drain terminal of MOS M. Both the currents pass through the resistance Rs going to ground GND, whereby they generate a positive signal, precisely the leading-edge spike. This is particularly apparent when the voltage between the drain and source terminals of transistor M is positive at turning on, i.e., for Vin>Vout/2, because the discharge current of the drain terminal is typically predominant. However, in this case, the spike would not alter the circuit operation because the signal on Rs would be positive in any case. However, in the presence of a gate charging current, the spike could also be significant if Vin<Vout/2 and anticipate the triggering of the ramp. Therefore, the use of device 63 is useful to obtain improved immunity against this disturbance.

Figure 6:
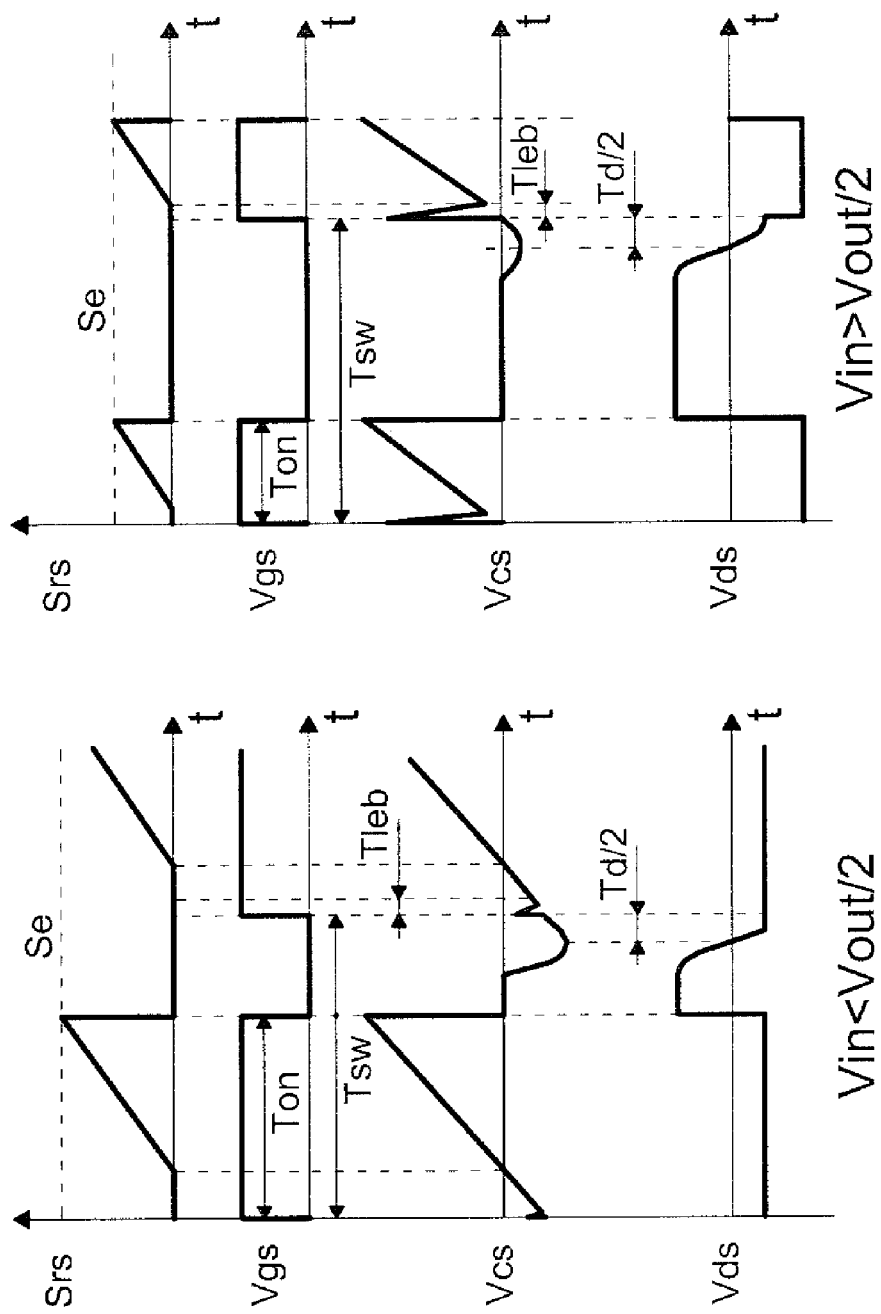
FIG. 6 shows the time diagrams of some signals involved in the circuit in FIG. 3 if Vin<Vout/2 or Vin>Vout/2.

FIG. 6 shows the time diagrams of some signals involved in the circuit in FIG. 5, i.e., the voltage Vgs between the gate and source terminals of transistor M, the voltage Vds between the drain and source terminals of transistor M, the ramp voltage Srs and the voltage Vcs across of the resistance Rs. As the duration of the time period Tleb is very short (typically between 150 and 300 ns), the presence of device 63 is practically transparent when Vin<Vout/2, whereas it introduces a delay precisely equal to Tleb when Vin>Vout/2.

The control device 100 is typically integrated in a small silicon chip except the capacitor Ce which is generally outside the integrated circuit.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device for controlling a switching converter that includes a switch, said control device comprising:
   first and second inputs configured to receive first and second signals indicative of first and second currents of the converter;
   a ramp generator configured to generate a ramp voltage;
   a comparator configured to control a final instant of an on period of the switch by comparing said ramp voltage with a first voltage;
   a control circuit configured to control closing of said switch according to said first signal; and
   a synchronizer configured to synchronize a start of the ramp voltage with a zero crossing of said second signal.

2. A device according to claim 1, wherein said synchronizer is configured to exactly synchronize the start of the ramp voltage with the zero crossing of said second signal.

3. A device according to claim 2, wherein:
   said ramp generator includes a capacitor, a current generator configured to supply a constant current to said capacitor, and a further switch arranged in parallel to said capacitor; and
   said synchronizer includes a NAND gate configured to control closing or opening of said further switch in response to a control signal of said switch and to the zero crossing of said second signal.

4. A device according to claim 1, wherein said synchronizer is configured to synchronize the start of the ramp voltage after a pre-fixed delay from the zero crossing of said second signal.

5. A device according to claim 4, wherein:
   said ramp generator includes a capacitor, a current generator configured to supply a constant current to said capacitor, and a further switch arranged in parallel to said capacitor, said second signal being representative of a current flowing through said switch; and
   said synchronizer includes:
      a zero crossing detector configured to produce a detection signal indicative of the zero crossing of the second signal;
      a delay element configured to produce a delay signal that is a delayed version of the detection signal; and
      a NAND gate configured to control closing or opening of said further switch based on a control signal of said switch and they delay signal.

6. A device according to claim 1, further comprising a capacitor and an error amplifier having a first input configured to receive a reference voltage, a second input configured to receive from the converter a voltage proportional to a regulated output voltage, and an output configured to provide the first voltage across the capacitor.

7. A device according to claim 6, wherein the first and second inputs, ramp generator, comparator, control circuit, synchronizer, and error amplifier are integrated in a semiconductor chip and wherein said capacitor is outside the semiconductor chip.

8. A power device, comprising:
   a switching converter configured to produce a regulated voltage from an input alternating supply voltage, said converter including a switch; and
   a control device configured to control an on time period and an off time period of said switch for each cycle of plural cycles, said control device including:
      first and second inputs configured to receive first and second signals indicative of first and second currents of the converter;
      a ramp generator configured to generate a ramp voltage;
      a comparator configured to control a final instant of an on time period of the switch by comparing said ramp voltage with a first voltage;
      a control circuit configured to control closing of said switch according to said first signal; and
      a synchronizer configured to synchronize a start of the ramp voltage with a zero crossing of said second signal.

9. A power device according to claim 8, wherein said converter includes a rectifier configured to produce a rectified supply voltage by rectifying the alternating supply voltage, a capacitor configured to filter the rectified supply voltage, an inductor coupled with said capacitor and said switch, and a resistance coupled with said switch and wherein the converter is configured to provide, as said second signal, a voltage across said resistance corresponding to a current through the inductor.

10. A power device according to claim 8, wherein the converter includes a rectifier configured to produce a rectified supply voltage by rectifying the alternating supply voltage, a capacitor configured to filter the rectified supply voltage, an inductor coupled with said capacitor and said switch, and a resistance coupled with said switch and wherein the converter is configured to provide, as said second signal, a voltage across said resistance corresponding to a current in said switch.

11. A power device according to claim 9, wherein the converter includes a rectifier configured to rectify the alternating supply voltage, a capacitor configured to filter the rectified supply voltage, an inductor coupled with said capacitor and said switch, and a resistance coupled with said switch and wherein the converter is configured to provide, as said first signal, a voltage across said resistance corresponding to a current through said switch.

* * * * *

UNITED STATES PATENT AND TRADEMARK OFFICE
CERTIFICATE OF CORRECTION

PATENT NO. : 8,467,209 B2  
APPLICATION NO. : 13/191300  
DATED : June 18, 2013  
INVENTOR(S) : Claudio Adragna Page 1 of 1

It is certified that error appears in the above-identified patent and that said Letters Patent is hereby corrected as shown below:

Title Page,

Item (73):
"STMicroelectronics S.r.l., Argrate Brianza (IT)" should read, --STMicroelectronics S.r.l., Agrate Brianza (IT)--.

Item (30):
--July 27, 2010 (IT).....MI2010A001379-- should be inserted.

Signed and Sealed this  
Third Day of December, 2013

Margaret A. Focarino  
*Commissioner for Patents of the United States Patent and Trademark Office*